United States Patent
Knodel et al.

(10) Patent No.: US 11,270,340 B2
(45) Date of Patent: Mar. 8, 2022

(54) AUTOMATIC FREQUENCY CAPPING

(71) Applicant: Bluecore, Inc., New York, NY (US)

(72) Inventors: Gino Knodel, New York, NY (US); Sophia Emma Nina Collet, New York, NY (US); Chen Huang, Queens, NY (US); Zahi Nadim Karam, Brooklyn, NY (US); Bryan Estes, Seattle, WA (US); Max Solomon Bennett, Brooklyn, NY (US)

(73) Assignee: Bluecore, Inc., New York, NY (US)

( * ) Notice: Subject to any disclaimer, the term of this patent is extended or adjusted under 35 U.S.C. 154(b) by 0 days.

(21) Appl. No.: 16/448,419

(22) Filed: Jun. 21, 2019

(65) Prior Publication Data

US 2020/0027124 A1 Jan. 23, 2020

Related U.S. Application Data

(60) Provisional application No. 62/828,084, filed on Apr. 2, 2019, provisional application No. 62/693,295, filed on Jul. 2, 2018.

(51) Int. Cl.
*G06Q 30/02* (2012.01)
*G06N 20/00* (2019.01)

(52) U.S. Cl.
CPC ......... *G06Q 30/0254* (2013.01); *G06N 20/00* (2019.01)

(58) Field of Classification Search
None
See application file for complete search history.

(56) References Cited

U.S. PATENT DOCUMENTS 7,013,290 B2 3/2006 Ananian
2001/0014868 A1 8/2001 Herz et al.
(Continued)

FOREIGN PATENT DOCUMENTS

WO   WO2020205492 A1   10/2020

OTHER PUBLICATIONS

Aarki. The Importance of Frequency Management. Retrieved from Internet Archive [Jun. 18, 2021], archived on [Sep. 4, 2017]. <URL: https://web.archive.org/web/20170904021955/https://www.aarki.com/blog/the-importance-of-frequency-management> (Year: 2017).*

(Continued)

*Primary Examiner* — Bion A Shelden
(74) *Attorney, Agent, or Firm* — Carr & Ferrell LLP

(57) ABSTRACT

Methods and corresponding systems for automatic frequency capping provide an automated decision-making process that decides dynamically how often the content of electronic communications from an entity should be sent to any specific customer or potential customer for a particular campaign. An individual customer's or potential customer's optimal electronic communication frequency is determined using machine learning and is based on behavior data. The method may comprise receiving from an entity, content and an audience, that includes at least a particular customer or potential customer, for use for generating electronic communications for the particular campaign; training a model to learn a personalized frequency for sending the electronic communications to each of the audience; based on the trained model, the content, and the audience, creating electronic communications to send to each of the audience; and causing the electronic communications to be sent to each of the audience at a frequency that is personalized.

19 Claims, 8 Drawing Sheets

(56) References Cited

U.S. PATENT DOCUMENTS

| | | | |
|---|---|---|---|
| 2002/0184139 A1* | 12/2002 | Chickering | G06Q 10/04 705/38 |
| 2004/0036622 A1 | 2/2004 | Dukach et al. | |
| 2007/0127650 A1* | 6/2007 | Altberg | G06Q 30/0275 379/114.13 |
| 2007/0244766 A1 | 10/2007 | Goel | |
| 2007/0271134 A1 | 11/2007 | Ferry et al. | |
| 2012/0066065 A1 | 3/2012 | Switzer | |
| 2013/0024211 A1 | 1/2013 | Monteforte et al. | |
| 2014/0006142 A1 | 1/2014 | Gaudet et al. | |
| 2014/0032265 A1* | 1/2014 | Paprocki | G06Q 30/0201 705/7.29 |
| 2014/0143803 A1 | 5/2014 | Narsimhan et al. | |
| 2014/0278918 A1 | 9/2014 | Moran | |
| 2015/0026719 A1 | 1/2015 | Menon | |
| 2015/0213372 A1* | 7/2015 | Shah | H04L 51/32 706/12 |
| 2015/0348134 A1* | 12/2015 | Jiang | G06Q 30/0275 705/14.71 |
| 2016/0189202 A1* | 6/2016 | Wang | G06Q 10/067 705/14.42 |
| 2016/0253709 A1* | 9/2016 | Chen | G06Q 30/0261 705/14.58 |
| 2017/0004408 A1* | 1/2017 | Edelen | G06Q 30/02 |
| 2017/0223137 A1* | 8/2017 | Yu | H04L 67/325 |
| 2017/0236131 A1 | 8/2017 | Nathenson et al. | |
| 2018/0012253 A1* | 1/2018 | Gavlovski | G06Q 30/0251 |
| 2018/0082213 A1* | 3/2018 | McCord | G06N 7/005 |
| 2018/0189843 A1* | 7/2018 | Kulkarni | G06Q 30/0244 |
| 2018/0219808 A1* | 8/2018 | Wala | G06F 3/04847 |
| 2018/0240147 A1* | 8/2018 | Stevens | G06Q 30/0276 |
| 2019/0034976 A1 | 1/2019 | Hamedi et al. | |
| 2019/0295004 A1* | 9/2019 | Chaturapruek | G06K 9/6256 |
| 2019/0303980 A1* | 10/2019 | Yan | G06N 20/00 |
| 2020/0320580 A1 | 10/2020 | Collet et al. | |
| 2020/0387936 A1 | 12/2020 | Estes et al. | |

OTHER PUBLICATIONS

Donnelly, M. The Missing Link to Email Marketing Success—Frequency Optimization. [Dated Dec. 10, 2017]. Retrieved from Internet. <URL: https://www.theseventhsense.com/blog/email-send-frequency-optimization> (Year: 2017).*

"International Search Report" and "Written Opinion"; Patent Cooperation Treaty Application No. PCT/US2020/025163; dated Jun. 19, 2020; 7 pages.

Kar et al., "Selection and Ordering of Linear Online Video Ads." In Proceedings of the 9th ACM Conference on Recommender Systems (ReeSys '15). Association for Computing Machinery, New York, NY, USA, Sep. 16-20, 2015, pp. 203-210.

* cited by examiner

AUTOMATIC FREQUENCY CAPPING

CROSS-REFERENCE TO RELATED APPLICATIONS

The present application claims the benefit of U.S. Provisional Application Ser. No. 62/693,295 filed Jul. 2, 2018 and U.S. Provisional Application Ser. No. 62/828,084, filed Apr. 2, 2019. The foregoing cross-referenced applications are hereby incorporated by reference in their entirety.

FIELD

The present technology relates generally to electronic communications and more specifically, to personalizing the frequency of the electronic communications.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

In various embodiments, methods and systems for automatic frequency capping are provided. An automated decision-making process decides dynamically how often an entity should send electronic communications to any specific customer (or potential customer). An individual customer's or potential customer's optimal frequency for sending the electronic communications may be determined using machine learning. In various embodiments, the resulting target frequency for each customer (or potential customer) is personalized, and can depend on the customer's or (or potential customer's) past behavioral data such as opens/views/clicks regarding the electronic communication, on-site interactions, purchases, and other relevant data. The entity may wish to conduct an organized course of action to promote or sell a product or service, which may be referred to as a campaign. In some embodiments, the frequency may also be determined based on data for other, different campaigns and predictions on how well a particular campaign would perform based on the performance of other campaigns, as explained in detail herein.

In various embodiments, methods and systems dynamically and automatically determine a frequency for electronic communications for a campaign that is personalized for each individual customer through the configuration of the campaign.

The electronic communication as used herein may be, for example, an email message, text message, social media message, or other type of electronic message suitable for practicing various embodiments. The communication may be for marketing purposes (a marketing communication) or other purposes consistent with this specification.

In some embodiments, the method is for automatic frequency capping for a campaign and comprises receiving, from an entity, content and an audience for use for generating electronic communications for a particular campaign, the audience including at least a particular customer or a potential customer; based at least on behavior data, training a model to learn a personalized frequency for sending the electronic communications to the particular customer or the potential customer; based on the trained model, the content, and the audience, creating at least one of the electronic communications to send to the particular customer or the potential customer; and causing the at least one of the electronic communications to be sent at the personalized frequency to the particular customer or the potential customer.

In other embodiments the method comprises receiving, from an entity, a content and an audience for use for generating electronic communications for a particular campaign, the audience including at least a particular customer or a potential customer, the campaign being an organized course of action to promote and sell a product or service; based at least on behavior data, training a machine-learning model to learn a personalized frequency for sending the electronic communications to the particular customer or the potential customer; based on the trained machine-learning model, the content, and the audience, creating the electronic communications to send to the particular customer or the potential customer; and sending the electronic communications to the particular customer or the potential customer at the personalized frequency; determining value of the particular campaign; wherein the training of the machine-learning model further comprises updating the personalized frequency based on the determined value or on new data associated with one or more actions of the particular customer or the potential customer in response to receipt of the electronic communications; and sending the electronic communications to the particular customer or the potential customer at the updated personalized frequency.

In some embodiments, a system is provided comprising an automatic frequency capping service configured to: receive, from an entity, content and an audience for use for generating electronic communications for a particular campaign, the audience including at least a particular customer or a potential customer; based at least on behavior data, train a model to learn a personalized frequency for sending the electronic communications to the particular customer or the potential customer; based on the trained model, the content, and the audience, create at least one of the electronic communications to send to the particular customer or the potential customer; and cause the at least one of the electronic communications to be sent at the personalized frequency to the particular customer or the potential customer.

DETAILED DESCRIPTION

Figure 1:
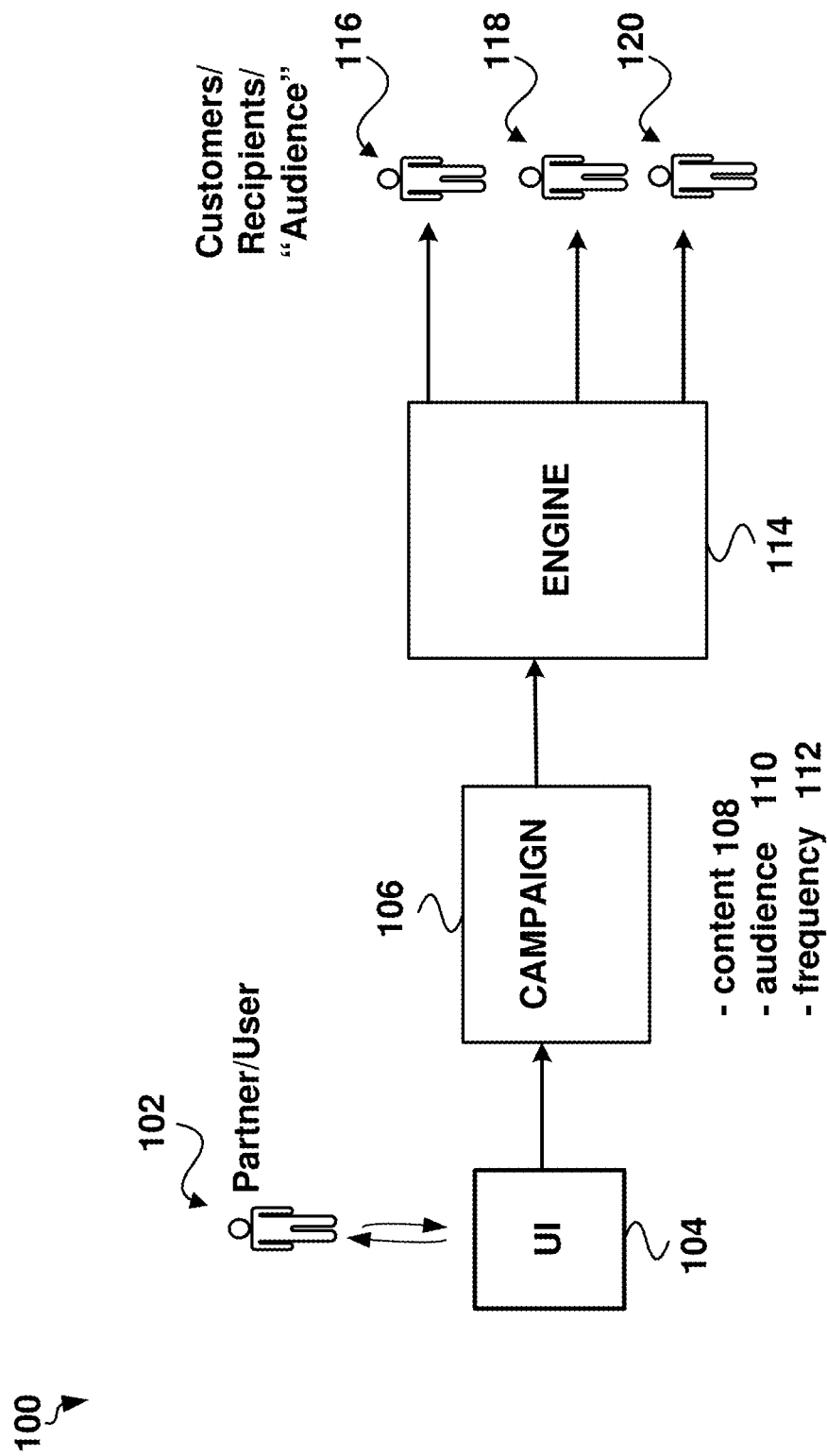
FIG. 1 illustrates an example system including a user interface (UI) used by a business or other entity, a campaign element, and an engine element.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

An entity may wish to conduct an organized course of action to promote or sell a product or service, which may be referred to as a campaign. The entity may be a business or an individual and the campaign can be, but is not necessarily, a marketing campaign since other types of campaigns fall within the scope of various embodiments of the method and corresponding system. Traditionally, the entity may desire that the campaign include electronic communications to certain intended recipients, including customers or potential customers. The entity may determine the recipients of their campaign by generating a target audience. This target audience may be defined by various conditional statements about customer's past behavior or attributes, for example, past open/click/purchase behavior, whether the customer added items to their cart, their predicted lifetime value, affinity to a certain product, etc. In some embodiments for the campaign, it can be determined that a certain electronic communication should only be sent to customers who have not received another electronic communication in a certain time frame.

The desired business outcome of a campaign is typically to maximize the likelihood of some engagement of the customer. For just one example, the reason to send a customer an electronic communication might be to inform them about products that the customer cares about which have recently been discounted; in order to achieve a particular business outcome (e.g., driving a second purchase, etc.). In this driving a second purchase example, the situation of the customer can be that of being a one-time buyer with a known preference toward a specific set of products. The desired business outcome in this particular example is to maximize the likelihood of converting one-time buyers into repeat buyers. This is just one example reason for sending the electronic communication; other reasons are well known to those in the art and/or detailed elsewhere herein.

FIG. 1 illustrates an example system 100 including a user interface (UI) 104 used by a business or other entity, a campaign element, and an engine element. It should be appreciated that human (or business entity) elements shown in the figures, e.g., 102, 116, 118, 120 included in FIG. 1, are not part of the system according to various embodiments, but are included for explanatory reasons. In the example in FIG. 1, a partner/user 102 (also referred to herein as just "user" 102) can interface with the UI 104 for selecting and/or inputting aspects (content 108, audience 110 and frequency 112) of the campaign 106. An engine 114 in the example in FIG. 1 sends electronic communications to various customers/recipients/audience 116, 118, 120 (which may include potential customers). For the campaign, the user may manually input both the content for the electronic communications and the audience to receive the electronic communications. Also, in the example in FIG. 1, the user may manually select a frequency for sending the electronic communications, i.e., a manual process for selecting the frequency is used conventionally.

The electronic communication may be, for example, an email message ("an email"), text message, or other type of electronic message suitable for practicing various embodiments. The communication may be for marketing purposes (a marketing communication) or other purposes consistent with this specification.

Figure 2:
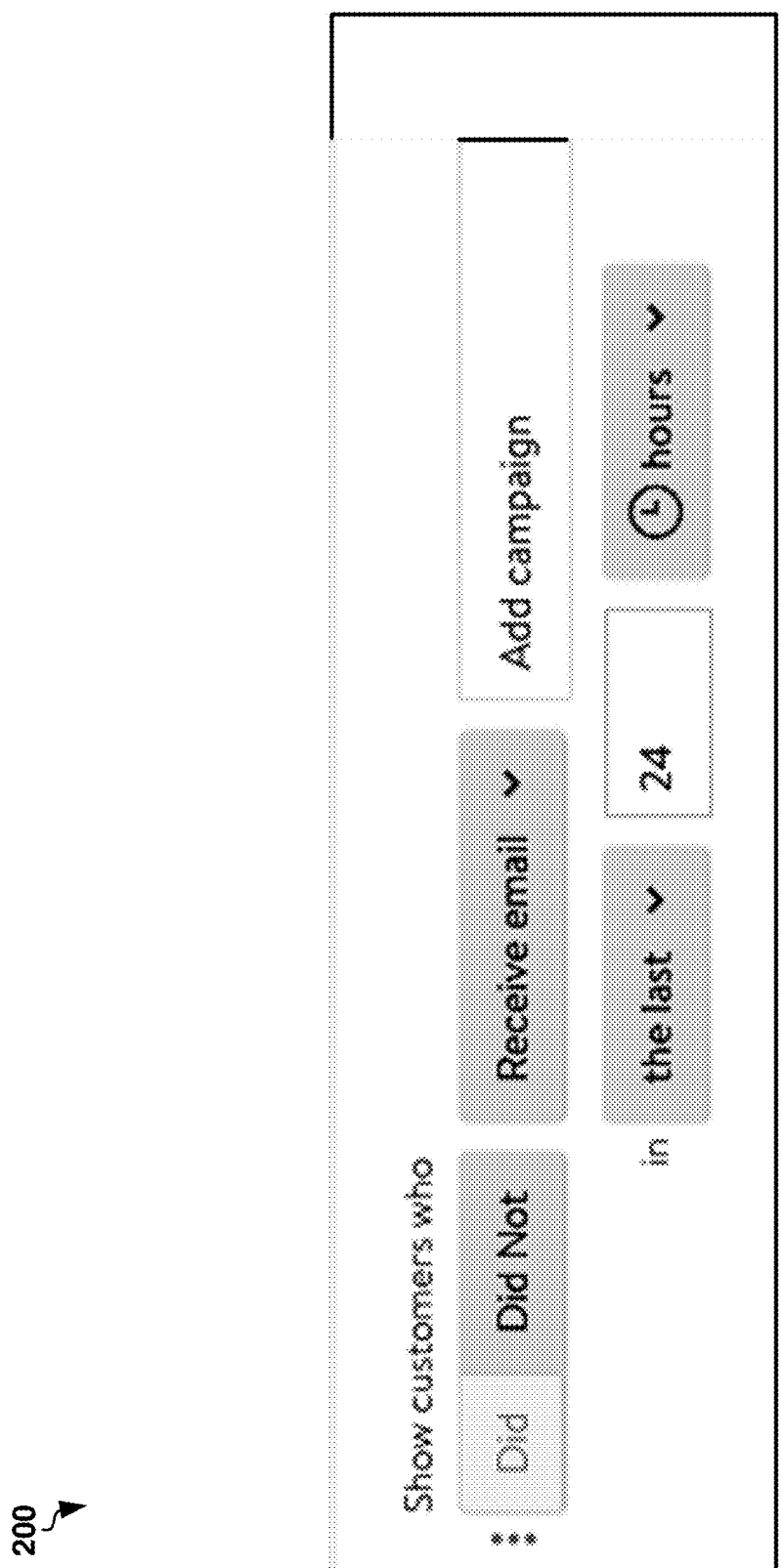
FIG. 2 is an example illustrating an example of the UI in FIG. 1, wherein a user can manually select a certain time frame referred to as a "minimum time between email" (MTBE).

FIG. 2 is an example illustrating an example 200 of the UI in FIG. 1, wherein a user can manually select a certain time frame referred to as a "minimum time between email" (MTBE). In setting this MTBE option, a manual frequency cap on the email sends can be effectively set. In the specific example in FIG. 2, the maximum email frequency for any user will be 1 email every 24 hours. This manual selection may be just based on the user's hunch or experience, for example. Although examples herein may mention email, it should be appreciated that other types of electronic communication may be used.

According to various embodiments of the present technology, automatic frequency capping removes this manual component of setting electronic communication frequencies from the UI, and instead determines and enforces the optimal frequency automatically.

Figure 3:
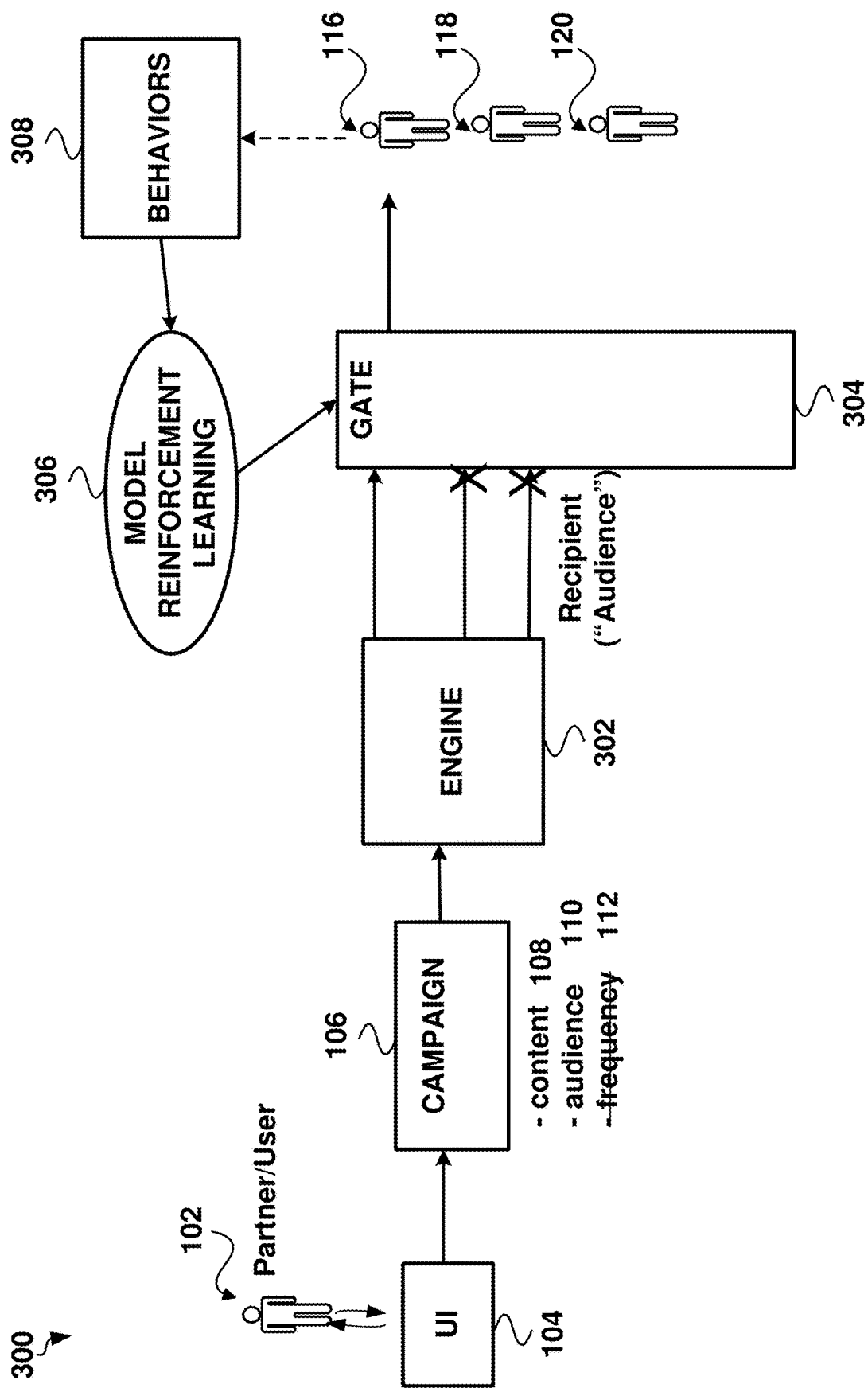
FIG. 3 is an example system illustrating aspects, for some embodiments, of automatic frequency capping and differences in the system compared to the system in FIG. 1.

FIG. 3 is an example system 300 illustrating aspects, for some embodiments, of automatic frequency capping and differences in the system compared to the system in FIG. 1. In the figures, the "X" represents a blocking of emails. The blocking is performed by a "gate" in this example. The gate is intended to refer to an automatic means to selectively block certain emails and selectively allow other emails in this example. The strike-through of frequency 112 indicates the frequency is not manually determined by the entity for the example in FIG. 3 (in contrast to the examples in FIG. 1 and FIG. 2).

Figure 4:
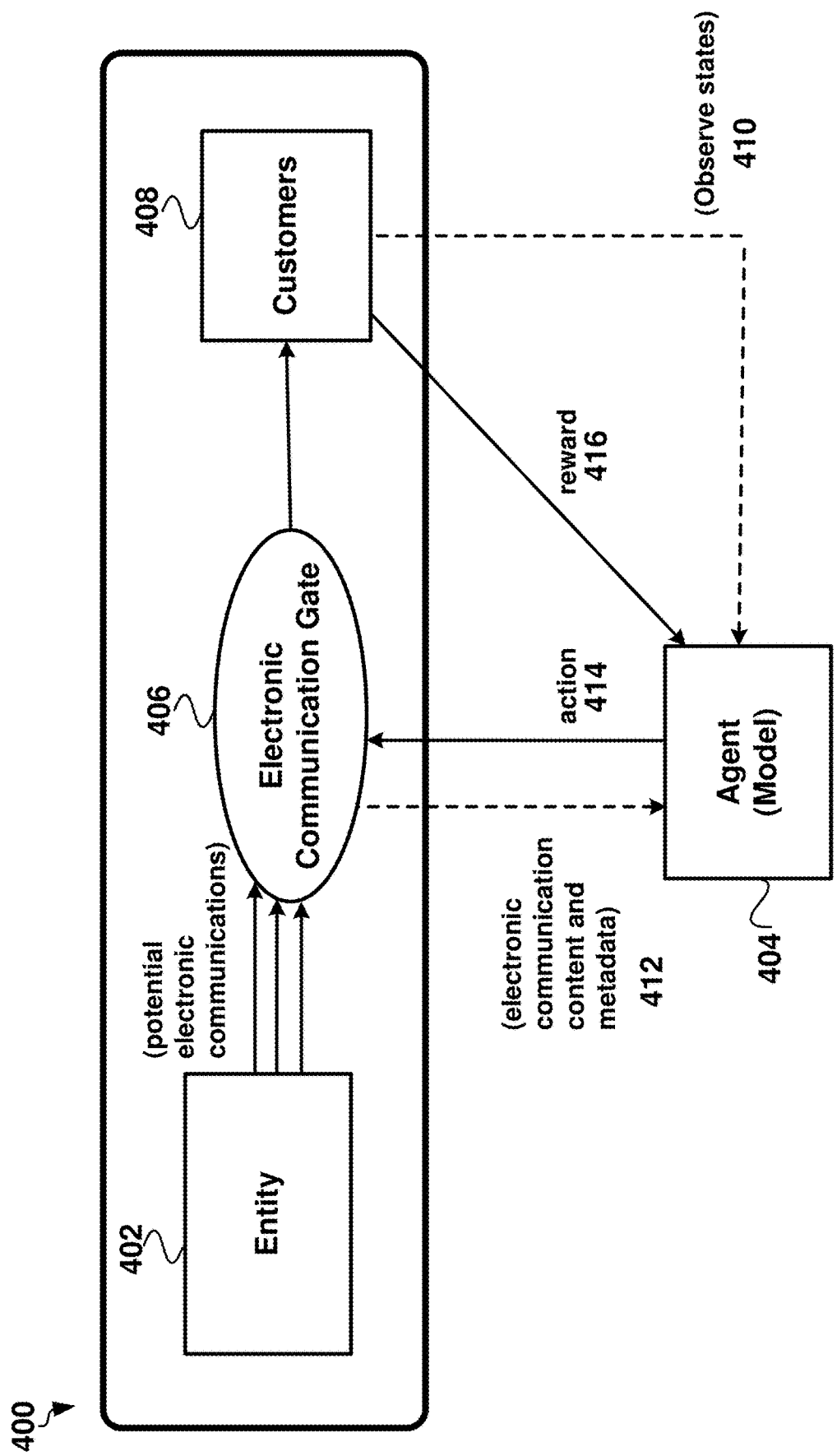
FIG. 4 is an example system diagram illustrating certain aspects of the agent (model) for automatic frequency capping and the aspects to and from the model, according to some embodiments.

FIG. 4 is an example system diagram 400 illustrating certain aspects of the agent (model) 404 for automatic frequency capping and the aspects to and from the model 404, according to some embodiments.

With reference to FIG. 4 along with FIG. 3, some embodiments of the methods and systems for automatic frequency capping may include two main components: a reinforcement learning model (also called model reinforcement learning 306 in FIG. 3 and agent (model) 404 in FIG. 4) and a gate (304 in FIG. 3 and an electronic communication gate 406 in FIG. 4). The reinforcement learning model (e.g., 306 and 404) can act as an "agent" who at any given moment in time decides a personalized action for each customer, e.g., with respect to creating and sending (or not sending) each electronic communication to that customer. This decision can represent the agent's current view on what the optimal frequency is, and may be based on various kinds of information, including but not limited to:

(1) Type and other email metadata, and the content and timing of email, e.g., 412).

(2) The "state" of each customer, given by the entirety of a customer's historical behavioral data (behaviors 308 in the example in FIG. 3, which can also be "observe states" 410 in FIG. 4).

(3) The "reward" 416 (or outcome) the system has observed in the past after taking certain actions. Possible rewards 416 can include click, no click, purchase, and unsubscribe, to name just a few.

In operation according to some embodiments, at each iteration step, the model uses these three kinds ((1)-(3) above) of new information to adjust the model's view on what the optimal electronic communication frequency is, and to find an improved set of best actions 414 for customers. After applying these new actions 414 and waiting for some time, new rewards 416 and new states 410 can be observed, which the model 404 (306 in FIG. 3) can use to further improve the actions 414, and so on.

In some embodiments, the action 414 that the agent (model) 404 takes is enforced by the gate (304 in FIGS. 3 and 406 in FIG. 4), which can function to allow or disallow certain electronic communications (e.g., from the entity 402 in FIG. 4) from being sent to customers 408 according to the action 414 the agent (model) 404 (306 in FIG. 3) has chosen. It should be appreciated that action 414 may encompass more than one action and the block customers 408 in this example is intended to encompass both existing customers and potential customers according to various embodiments.

In various other embodiments, that gating aspect is not used after the electronic communications are created, but rather gating may be used before the electronic communications are created, as a kind of blocking upfront, as is explained further herein.

For an entity, it is desirable to optimize certain aspects, e.g., expected future clicks of electronic communications by a customer or potential customer. The problem of optimizing expected future clicks can be phrased as a reinforcement learning problem. An agent is interacting with an environment (customers) by taking certain actions. In various embodiments, the possible actions are whether or not a customer should be marked as eligible or not eligible for an electronic communication. A goal of the reinforcement learning model according to various embodiments is to find the best action to take in any given situation.

More specifically regarding various embodiments, customers (or groups of customers) are modeled, at least in part, by assigning them a state ("S"). This state may be in general determined by a customer's historical behavioral data. In exemplary operation (see especially FIG. 4), after taking an action ("A"), a reward (e.g., click/no click/unsubscribe) is observed, and, because the customer has had time to interact with the electronic communication or website, it is consequently found that the customer is in a new state S'. Using this data, the model can find an optimal policy, which is a set of rules that map each state S to the best action A to take, in order to maximize the future reward.

Other aspects used by the model in various embodiments are explained further herein.

The model can optimize for certain data such as purchase data related to actual purchases by the recipient of the electronic communications. The model can also optimize for click data e.g., a lifetime value of clicks, which is defined as the total expected number of clicks for a customer during the entire time he/she remains subscribed to the electronic communication list. In various embodiments, this lifetime value of clicks is used, rather than, for example, just the immediate reward after a particular electronic communication is sent in order to ensure taking into account both the positive effect of clicks and the negative side effect of unsubscribes. An unsubscribed customer will neither receive nor click on any electronic communication, so according to some embodiments, an unsubscribe event constitutes a potential loss that needs to be taken into account by the model when making decisions. The result is that various embodiments of the model will choose an optimal frequency that is not too low, because it would lead to very few clicks, nor one that is too high, because it would lead to too many unsubscribes.

The model can be optimized for user-specific historical data, aggregate data on the campaign level and/or other data. Together the data can be used to determine which campaign has the highest value for a given user, from which the model in various embodiments can derive the optimal email frequency per user.

In some embodiments, the user-specific historical data may include for example: electronic communications delivery data, electronic communications open data, electronic communications click data, electronic communications unsubscribe/resubscribe data, and purchase data (online and in-store).

In some embodiments, the aggregate data on the campaign level includes for example: campaign name; campaign type (e.g. trigger vs. batch campaign); subject line; electronic communication content (e.g. recommendations, offers); schedule; past performance of other campaigns; and/or attributes of target audience (e.g. audience definition, audience size).

In some embodiments, the model is optimized for other data including: adding/removing products from cart/wishlist; on-site browsing, on-site product views (including product features such as price, category); on-site searches; other on-site behavior (e.g., filling out a survey, navigating to the help page); user reviews and explicit feedback; location and device data; and/or client-specified measures of expected campaign performance.

The model may also be optimized for: offline data (e.g., in-store visits); product returns data; user demographic data (e.g., age, location, gender); client-specific user data (e.g., loyalty status, applied for client credit card); client business goals (e.g., sell-through goals, inventory constraints, margin goals); and/or product margin data.

In some embodiments such as, for example, those in FIG. 3 and FIG. 4, after the reinforcement learning model has found the optimal policy, this policy needs to be applied to the email engine to enforce emailing each customer with his/her optimal frequency. The way the model interacts with the email engine, in various embodiments, is by setting a gate status, which determines at any moment in time if a certain customer is eligible for receiving an email or not. This means that there are two possible actions in various embodiments: gate open or gate closed. In some embodiments, at the time of generating an email audience, each customer is checked against their gate status, and only customers with status "gate open" are selected. The models 306 and 404 may, in various embodiments, include, but is not limited to, utilizing techniques such as least squares policy iteration, random forests, Q-learning, Bayesian models, support vector machines (SVM), federated learning, or neural networks.

Instead of using one global model to determine the best policy for each user, some embodiments use a multi-layered (or multi-tiered) approach.

Figure 5:
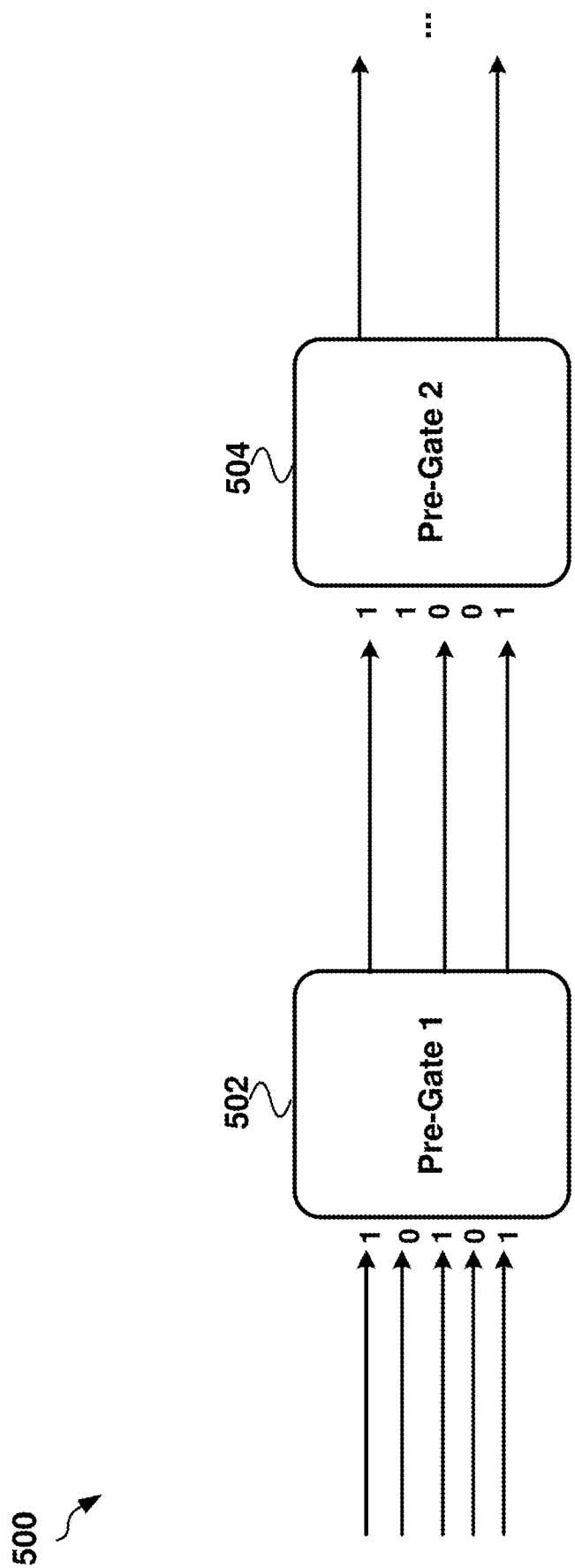
FIG. 5 illustrates an example of a pre-gate arrangement, according to example embodiments.
Figure 6:
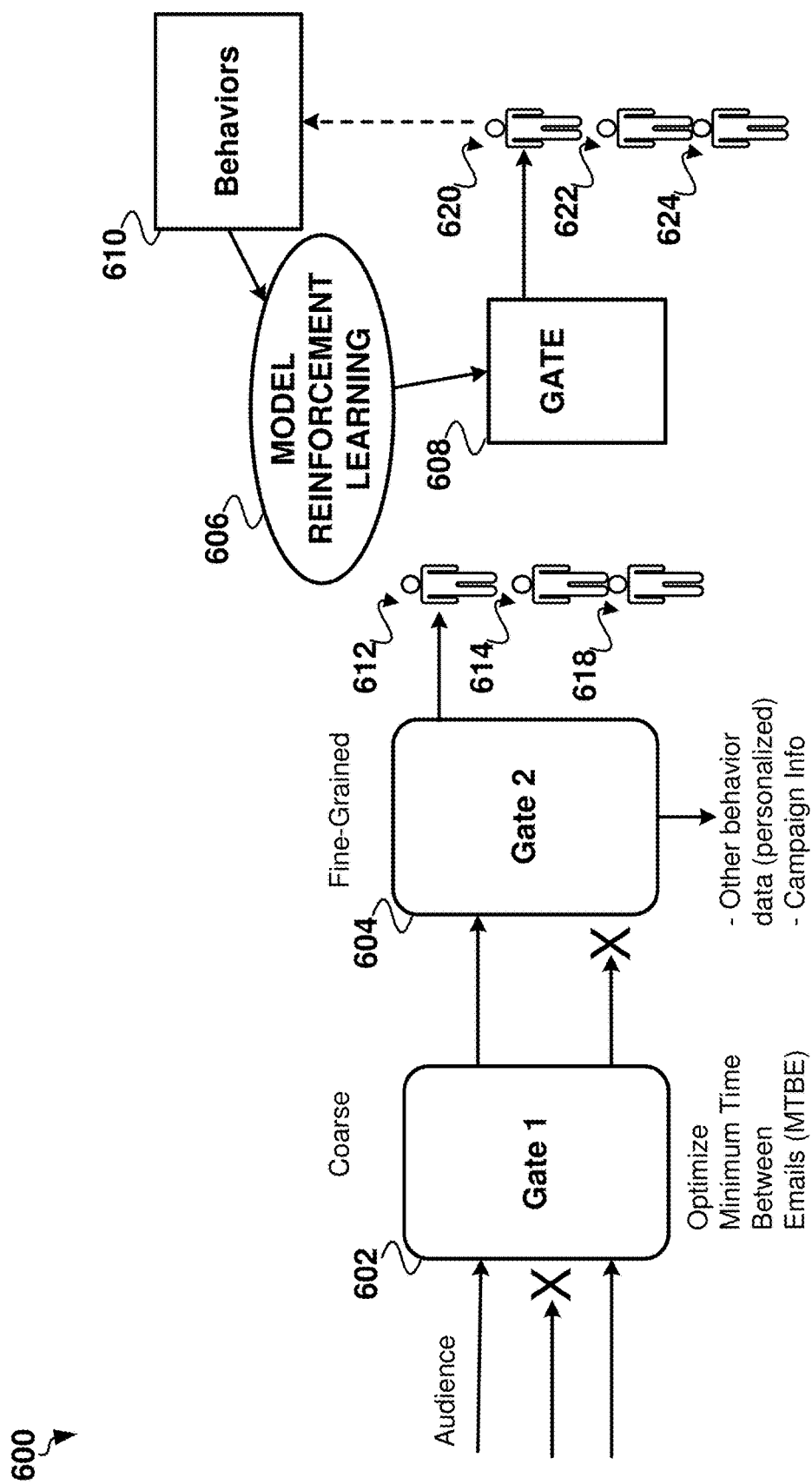
FIG. 6 illustrates additional aspects of the pre-gate arrangement in an overall system, according to another example embodiment.

In some embodiments, this multi-layer approach having multiple levels of gates. FIG. 5 illustrates an example 500 of a pre-gate arrangement (having a Pre-Gate 1 identified as 502, followed by a Pre-Gate 2 identified at 504). FIG. 6 illustrates additional aspects 600 of the pre-gate arrangement in an overall system according to another example embodiment. The additional aspects 600 include starting with a rough pre-filter model that makes decisions on a coarse grained level, e.g., having a model reinforcement learning 606 make decisions for controlling a coarse gate 1 identified at 602, the coarse gate 602 being part of an overall gate 608 in the example in FIG. 6. This layer can be followed by one or more fine-grained models that make decisions taking more individual-level features (as explained further below and above, including, but not limited to, behaviors 610) into account, e.g., having a model reinforcement learning 606 make decisions for controlling a fine-grained gate 1 identified at 604, the fine-grained gate 604 being part of an overall gate 608 in the example in FIG. 6. In some embodiments, the final gate status (0/1 for closed/open) is simply the product of all individual pre-gates. Because, according to some of the embodiments, actions are phrased in terms of gates, these pre-gate models can be easily layered on top of each other, so that at each stage the audience size is reduced more. This design can allow the architecture to be easily extended with more and more fine-grained model components. In general for some embodiments, the model used in each layer gets more complex from left to right, starting with a coarse pre-selection using statistical inference, to more advanced and more personalized models.

Figure 7:
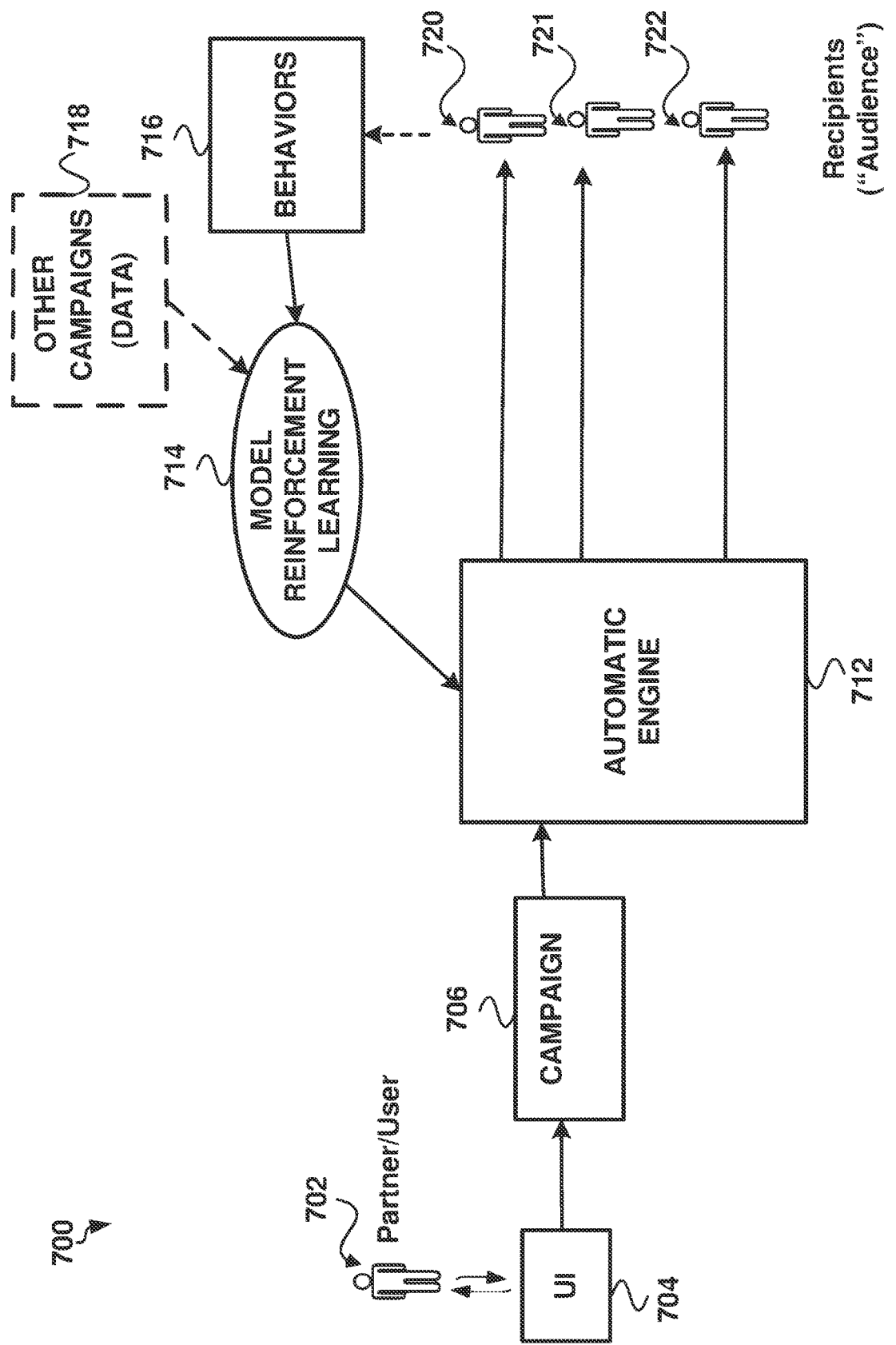
FIG. 7 illustrates aspects of an overall system for an automatic frequency capping platform, according to various embodiments.

FIG. 7 illustrates aspects of an overall system 700 for an automatic frequency capping platform, according to various embodiments. It should be appreciated that human (or business entity) elements 702, 720, 721 and 722 shown in FIG. 7 are not elements of a claimed system but are included for explanatory reasons.

In the example in FIG. 7, a partner/user 702 (also referred to herein as just "user" 702 or entity 702) can interface with the UI 704 for selecting and/or inputting aspects of the campaign 706. The aspects can include, but are not limited to, content, audience, and schedule. The schedule received from the partner/user (entity) 702 in this regard refers to scheduling information other than the optimal frequency determined and provided according to various embodiments. The schedule information that may be received from the partner/user (entity) 702 can include for example, specific times to send the campaign, or a recurring time window (hourly/daily/weekly/monthly/etc.). An automatic engine 712 in the example in FIG. 7 can automatically create and send electronic communications to various recipients 720, 721, and 722 (which may include potential customers) at a determined frequency. In some embodiments, the electronic communications are sent by third party providers to the recipients/audience. In other embodiments, the creating and sending of the electronic communication is performed by the same party.

In various embodiments, the frequency for sending the electronic communications is determined based on a model (e.g., Model Reinforcement Learning 714, also referred to herein as model 714). The model 714 can decide at any given moment a personalized action for each customer, e.g., with respect to creating and sending each electronic communication to that customer. This decision can include and represent the model's current view on what the optimal frequency is, and may be based on various kinds of data. The data may include but not be limited to: behaviors 716 (e.g., direct feedback from recipient's actions or inactions). In some embodiments, the data provided to the model 714 may also include and in some embodiments, data from other campaigns.

Instead of selecting users/electronic communications and then selectively blocking them as in some other embodiments, the model 714 and automatic engine 712 can provide a mechanism such that users who should not get electronic communications in the first place are not selected, e.g., only electronic communications that will be sent to a recipient will be created. This mechanism for the combination of the model 714 and automatic engine 712 can be implemented via an SQL query in some embodiments.

The automatic engine 712, in various embodiments, determines the frequency for sending electronic communications based on the model 714, so as to provide an automatic and more personalized approach for sending electronic communications to the recipients 720, 721, and 722 in the example in FIG. 7.

The frequency for sending electronic communications can be optimized for certain metrics which can include, for example, behaviors 716. At least some of the behaviors 716 provide direct feedback from the recipients 720, 721, and 722.

The model 714 can be optimized for user-specific historical data, aggregate data on the campaign level and/or other data. Together the data can be used to determine which campaign has the highest value for a given user, from which the model in various embodiments can derive the optimal email frequency per user.

The user-specific historical data may include for example: electronic communications delivery data, electronic communications open data, electronic communications click data, electronic communications unsubscribe/resubscribe data, and purchase data (online and in-store).

In some embodiments, the aggregate data on the campaign level includes for example: campaign name; campaign type (e.g. trigger vs. batch campaign); subject line; electronic communication content (e.g. recommendations, offers); schedule; past performance of other campaigns; and/or attributes of target audience (e.g. audience definition, audience size).

The model 714 can be optimized for other data including: adding/removing products from cart/wishlist; on-site browsing, on-site product views (including product features such as price, category); on-site searches; other on-site behavior (e.g., filling out a survey, navigating to the help page); user reviews and explicit feedback; location and device data; and/or client-specified measures of expected campaign performance.

In various embodiments, the model 714 is also optimized for: offline data (e.g., in-store visits); product returns data; user demographic data (e.g., age, location, gender); client-specific user data (e.g., loyalty status, applied for client credit card); client business goals (e.g., sell-through goals, inventory constraints, margin goals); and/or product margin data.

The historical data may also include data from other campaigns 718 in FIG. 7) and can include data from the current campaign. Regarding other campaigns, the historical data can include which are the campaigns that tend to perform very well by making people click on their electronic communications or purchase a product; which are the campaigns that do not perform very well, and other characteristics. Regarding data from the current campaign, for example, a user could set up a "weekly bestseller campaign", which may send different looking electronic communications to a changing audience each week. Although one could technically define each weekly send as its own "campaign" for this example, those weekly sends are generally understood to be part of the same campaign. This means that, for this example, the model can predict the future performance of the weekly campaign based on how well this same campaign has done in the previous weeks.

Based on the historical data, various embodiments use the model 714 to make a prediction on whether the present campaign is going to be a high value or a low value campaign. This learning from data for other campaigns and/or from the current campaign can be very powerful. For example, especially if an entity may have a hundred other campaigns already executed from which much can be learned. In various embodiments, at least some of the settings for those other campaigns are determined, e.g., schedule sending monthly or weekly for the campaign; does the other campaign have recommendations, dynamic content, or other notable features. Based at least in part on these settings, other characteristics of the other similar campaigns, and/or data from the current campaign, the methods according to various embodiments predict what the expected performance of the current campaign is, e.g., based on how well other campaigns have done in the past and/or how the current campaign has done in the past. For example, if last year, an entity initiated a Black Friday campaign with a discount and that campaign performed very well, then even though it has not been tried yet, a similar campaign should predictably do well again in the current year. For another example, if the weekly sends of a "weekly bestseller campaign" have performed well, future weekly sends of that same campaign should predictably also do well. This historical data, for other campaigns and for the same campaign, can be another ingredient to the model, e.g., model 714 in the example in FIG. 7.

Results from similar other campaigns and the similarities in the settings between other campaigns and the new campaign may be weighted to make the prediction. This prediction may be used to assess how the new campaign is performing against the prediction. Similarly, results from prior sends of the same campaign and similarities in the settings between prior recurring sends and new sends for the same campaign may also be part of the weighting for making the prediction.

In some embodiments, data is combined (both on a customer and a campaign level) across different entities (also referred to herein as partners). Using the combined data, the model may still use campaign level data to predict how well campaigns will do and combine it with customer data to select the best frequency for each customer/potential customer. However, by using data from different partners, some embodiments can transfer some of the learnings between different partners. For example, if a particular partner has never sent a Black Friday electronic communication before, but much data has been collected on other partners' Black Friday electronic communications and there is knowledge that this type of campaign tends to perform well, this insight can be used in some embodiments to predict that the given partner's campaign will also do well. For another example on the user level, if it is known from other partners' data that a given user likes to receive a lot of electronic communications and therefore his/her ideal electronic communication frequency is high, some embodiments use this knowledge from one partner for automatically determining the frequency to use for a campaign of another partner, even if that other partner has never sent an electronic communication to that particular user before.

The model in various embodiments could also be used to determine which configuration settings for a campaign have the highest value. Determination of the highest value with respect to campaigns is also discussed in Application No. 62/828,084, filed Apr. 2, 2019, which is incorporated by reference herein in its entirety. For example, if it is determined that a particular frequency of sending electronic communications does not interfere with other campaigns that the entity is doing, then this particular frequency may be preferred.

The predictive aspects of the model 714 can anticipate how a current campaign will do, and if, for example, the current campaign is predicted to be a high value campaign, then the current campaign can be prioritized, e.g., increasing the frequency of sending electronic communications. On the other hand, if the model 714 predicts that the current campaign is a low value campaign, then the frequency of sending electronic communication for this campaign can be lowered resulting in fewer electronic communications being sent for the low value campaign.

The model 714 according to example embodiments may include and/or utilize various machine learning techniques including, but not limited to techniques such as least squares policy iteration, random forests, Bayesian, support vector machines (SVM), federated learning, or neural networks.

The models 306 and 404 may, in various embodiments, include, but are not limited to, utilizing techniques such as least squares policy iteration, random forests, Q-learning Bayesian models, support vector machines (SVM), federated learning, or neural networks.

The model's automatically determining of the frequency of an electronic communication can be based on the prediction, e.g., the likelihood and predictive value.

Behavior data can include, in addition to data regarding past campaigns, new data concerning actions or inaction of the current customer of the campaign, e.g., opening the electronic communication, past clicks on the electronic communication, and associated purchases made. In addition, the behavior data could also include what the customer is clicking on within a website, purchase actions, placing a product or service in a cart online, browsing from a general webpage having a number of products to a webpage for a particular product, putting an item in the cart but not purchasing, unsubscribing or otherwise blocking future electronic communications, and other available data.

In some embodiments, the model is optimized based on whatever the most data is available for. For example, for entities for which there is a lot of available purchase data, the model can optimize based on the purchase data. On the other hand, if purchases are rare for some entities, e.g., new entities or new class of products/services where past purchases are rare or the nature of the product/service is that a very limited number of purchases are made, then the model may be optimized for click data or whatever data is available that works best for the particular entity. In some embodiments, the data used by the model is a metric based on characteristics of the particular entity, e.g., selling high priced item for which purchases are infrequent.

Figure 8:
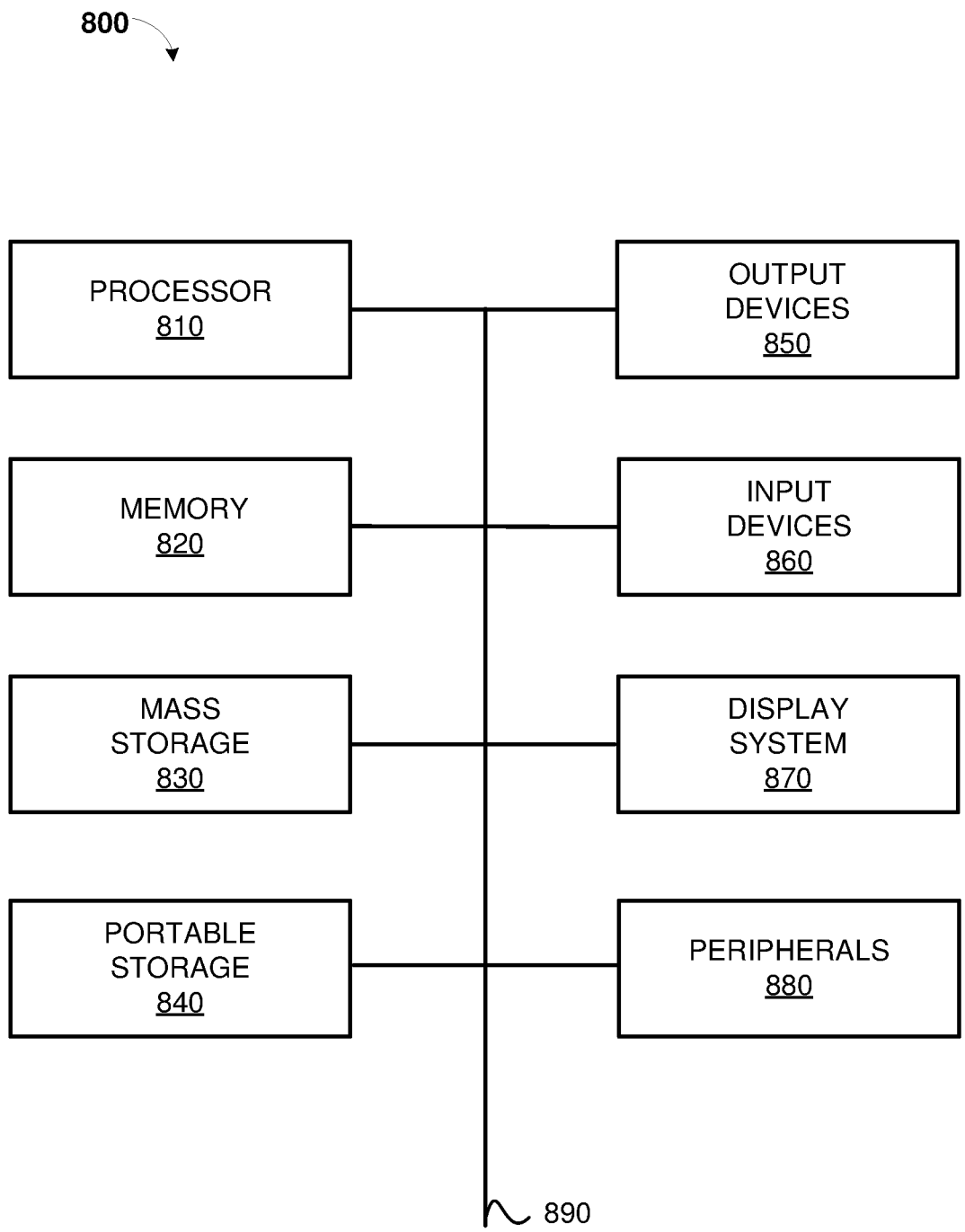
FIG. 8 is a simplified block diagram of a computing system, according to some embodiments.

FIG. 8 illustrates an exemplary computer system 800 that may be used to implement some embodiments of the present invention. The computer system 800 in FIG. 8 may be implemented in the contexts of the likes of computing systems, networks, servers, or combinations thereof. The computer system 800 in FIG. 8 includes one or more processor unit(s) 810 and main memory 820. Main memory 820 stores, in part, instructions and data for execution by processor unit(s) 810. Main memory 820 stores the executable code when in operation, in this example. The computer system 800 in FIG. 8 further includes a mass data storage 830, portable storage device 840, output devices 850, user input devices 860, a graphics display system 870, and peripheral device(s) 880.

The components shown in FIG. 8 are depicted as being connected via a single bus 890. The components may be connected through one or more data transport means. Processor unit(s) 810 and main memory 820 are connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit(s) 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 in FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 include a liquid crystal display (LCD) or other suitable display device. Graphics display system 870 is configurable to receive textual and graphical information and processes the information for output to the display device. Peripheral device(s) 880 may include any type of computer support device to add additional functionality to the computer system.

Some of the components provided in the computer system 800 in FIG. 8 can be those typically found in computer systems that may be suitable for use with embodiments of the present disclosure and are intended to represent a broad category of such computer components. Thus, the computer system 800 in FIG. 8 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including MAC OS, UNIX, LINUX, WINDOWS, PALM OS, QNX, ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 800 may be implemented as a cloud-based computing environment, such as a virtual machine operating within a computing cloud. In other embodiments, the computing system 800 may itself include a cloud-based computing environment, where the functionalities of the computing system 800 are executed in a distributed fashion. Thus, the computing system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as PYTHON, RUBY, JAVASCRIPT, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method for automatic frequency capping for a campaign, the method comprising:
   receiving, from an entity, content and an audience for use generating electronic communications for a particular campaign, the audience including at least a particular individual customer or a potential individual customer;
   based at least on historical behavior data for the particular individual customer or the potential individual customer, training a reinforcement learning model to learn and optimize a personalized frequency for sending the electronic communications to the particular individual customer or the potential individual customer, the reinforcement learning model iteratively basing its actions, defined as a minimum time between emails, on (i) type and other email metadata, (ii) a state for the particular individual customer or the potential individual customer, including a number of emails clicked for a predetermined period of time, opened for a predetermined period of time, a number of purchases for a predetermined period of time, and a subscription state and (iii) a past outcome including click, no click, purchase or no purchase for the particular individual customer or the potential individual customer, with a model-based policy iteration receiving (i)-(iii) as inputs to determine an optimal policy comprising a set of rules for which action to take when the particular individual customer or the potential individual customer is in a given state and wherein the action is executed by a multi-layered gate for the particular individual customer or the potential individual customer, the personalized frequency designated for the particular individual customer or the potential individual customer;

wherein the optimal policy includes optimizing the personalized frequency to maximize a number of rewards received from the particular individual customer or the potential individual customer in a manner that does not result in disengagement of the particular individual customer or the potential individual customer;

based on the content and the audience, creating at least one of the electronic communications to send to the particular individual customer or the potential individual customer;

causing the at least one of the electronic communications to be sent at the personalized frequency to the particular individual customer or the potential individual customer; and further training the reinforcement learning model to update the personalized frequency based on new data from an action of the particular individual customer or the potential individual customer in response to receipt of the at least one of the electronic communications.

2. The method of claim 1, wherein the particular campaign is an organized course of action to promote and sell a product or service.

3. The method of claim 1, wherein the reinforcement learning model is trained via machine learning in accordance with a technique comprising: least squares policy iteration, random forests, Q-learning, Bayesian models, support vector machines (SVM), federated learning, or neural networks.

4. The method of claim 1, wherein the historical behavior data includes historical data for at least one campaign other than the particular campaign.

5. The method of claim 1, wherein the historical behavior data comprises actions or inactions, the actions including:
clicking, by a recipient of the at least one of the electronic communications, on at least one of the electronic communications;
purchasing, by the recipient, one or more products or services within a website associated with the at least one of the electronic communications;
interactions of the recipient of the at least one electronic communications with the website associated with the at least one of the electronic communications; or
on-site behavior that includes location data.

6. The method of claim 1, further comprising the reinforcement learning model making a prediction of performance of the particular campaign based on:
past performance of the particular campaign, and/or
past performance of at least one other different campaign of the entity and/or of other entities.

7. The method of claim 6, further comprising the reinforcement learning model assessing actual performance of the particular campaign against the prediction of performance.

8. The method of claim 6, wherein the reinforcement learning model determines, based on the prediction of performance, at least one action or at least one configuration setting for future electronic communications for the particular campaign.

9. The method of claim 1, further comprising having the reinforcement learning model determine which configuration settings for the particular campaign have a highest value.

10. The method of claim 9, further comprising the reinforcement learning model making a prediction of performance of the particular campaign and:

for the particular campaign predicted to be a high value campaign, prioritize the particular campaign including increasing the personalized frequency of sending the electronic communications; and for the particular campaign predicted to be a low value campaign, lowering the personalized frequency of sending the electronic communications such that fewer electronic communications are caused to be sent for the low value campaign compared to the high value campaign.

11. The method of claim 1, wherein the reinforcement learning model optimizes for: opening of the at least one of the electronic communications by a recipient, or conversions to sales to the recipient of the at least one of the electronic communications.

12. The method of claim 1, wherein the reinforcement learning model determines a set of rules that map states of the particular individual customer or the potential individual customer to optimal actions to take regarding future electronic communications so as to optimize a future reward.

13. The method of claim 12, wherein the future reward includes a total expected number of clicks on the electronic communications or a number of purchases, by the particular individual customer or the potential individual customer during an entire time the particular individual customer or the potential individual customer is receiving the electronic communications from the particular campaign.

14. The method of claim 1, wherein the at least one of the electronic communications includes an email message, text message, or other social media message.

15. The method of claim 1, further comprising sending the at least one of the electronic communications to the particular individual customer or the potential individual customer at the personalized frequency, such that the creating and the sending are performed by a same party.

16. The method of claim 1, wherein a third party service provider sends the at least one of the electronic communications.

17. A method for automatic frequency capping for a campaign, the method comprising:
receiving, from an entity, a content and an audience for use generating electronic communications for a particular campaign, the audience including at least a particular individual customer or a potential individual customer, the particular campaign being an organized course of action to promote and sell a product or service;
based at least on historical behavior data for the particular individual customer or the potential individual customer, training a machine-learning model to learn and optimize a personalized frequency for sending the electronic communications to the particular individual customer or the potential individual customer, the reinforcement learning model iteratively basing its actions, defined as a minimum time between emails, on (i) type and other email metadata, (ii) a state for the particular individual customer or the potential individual customer, including a number of emails clicked for a predetermined period of time, opened for a predetermined period of time, a number of purchases for a predetermined period of time, and a subscription state and (iii) a past outcome including click, no click, purchase or no purchase for the particular individual customer or the potential individual customer, with a model-based policy iteration receiving (i)-(iii) as inputs to determine an optimal policy comprising a set of rules for which action to take when the particular individual customer or the potential individual customer is in a given state and wherein the action is executed by a multi-layered gate for the particular individual customer or the potential individual customer, the personalized frequency designated for the particular individual customer or the potential individual customer;

wherein the optimal policy includes optimizing the personalized frequency to maximize a number of rewards received from the particular individual customer or the potential individual customer in a manner that does not result in disengagement of the particular individual customer or the potential individual customer;

based on the content and the audience, creating the electronic communications to send to the particular individual customer or the potential individual customer;

sending the electronic communications to the particular individual customer or the potential individual customer at the personalized frequency;

determining value of the particular campaign based on a plurality of data sources;

based on the determined value or on new data associated with one or more actions of the particular individual customer or the potential individual customer in response to receipt of the electronic communications, further training the machine-learning model to update the personalized frequency;

sending the electronic communications to the particular individual customer or the potential individual customer at the updated personalized frequency; and further training the reinforcement learning model to update the personalized frequency based on new data from an action of the particular individual customer or the potential individual customer in response to receipt of the at least one of the electronic communications.

18. A system, comprising:

an automatic frequency capping service having a hardware processor configured to:

receive, from an entity, content and an audience for use generating electronic communications for a particular campaign, the audience including at least a particular individual customer or a potential individual customer;

based at least on historical behavior data for the particular individual customer or the potential individual customer, train a reinforcement learning model to learn and optimize a personalized frequency for sending the electronic communications to the particular individual customer or the potential individual customer, the reinforcement learning model iteratively basing its actions, defined as a minimum time between emails, on (i) type and other email metadata, (ii) a state for the particular individual customer or the potential individual customer, including a number of emails clicked for a predetermined period of time, opened for a predetermined period of time, a number of purchases for a predetermined period of time, and a subscription state and (iii) a past outcome including click, no click, purchase or no purchase for the particular individual customer or the potential individual customer, with a model-based policy iteration receiving (i)-(iii) as inputs to determine an optimal policy comprising a set of rules for which action to take when the particular individual customer or the potential individual customer is in a given state and wherein the action is executed by a multi-layered gate for the particular individual customer or the potential individual customer, the personalized frequency designated for the particular individual customer or the potential individual customer;

wherein the optimal policy includes optimizing the personalized frequency to maximize a number of rewards received from the particular individual customer or the potential individual customer in a manner that does not result in disengagement of the particular individual customer or the potential individual customer;

based on the content and the audience, create at least one of the electronic communications to send to the particular individual customer or the potential individual customer;

cause the at least one of the electronic communications to be sent at the personalized frequency to the particular individual customer or the potential individual customer; and further training the reinforcement learning model to update the personalized frequency based on new data from an action of the particular individual customer or the potential individual customer in response to receipt of the at least one of the electronic communications.

19. The method of claim 17, wherein the plurality of data sources for determining the value of the particular campaign comprise at least a campaign name, campaign type, subject line of the at least one of the electronic communications, content of the at least one of the electronic communications, schedule, past performance of other campaigns, or attributes of a target audience.

* * * * *